US010583505B2

(12) United States Patent
Nakajima et al.

(10) Patent No.: US 10,583,505 B2
(45) Date of Patent: Mar. 10, 2020

(54) CIRCULAR SAW BLADE WITH TIPS

(71) Applicant: Kanefusa Kabushiki Kaisha, Niwa-gun, Aichi (JP)

(72) Inventors: Yasutaka Nakajima, Niwa-gun (JP); Fuminori Okabe, Niwa-gun (JP)

(73) Assignee: Kanefusa Kabushiki Kaisha, Niwa-gun (JP)

( * ) Notice: Subject to any disclaimer, the term of this patent is extended or adjusted under 35 U.S.C. 154(b) by 0 days.

(21) Appl. No.: 15/740,762

(22) PCT Filed: Jul. 28, 2016

(86) PCT No.: PCT/JP2016/072177
§ 371 (c)(1),
(2) Date: Dec. 28, 2017

(87) PCT Pub. No.: WO2017/033658
PCT Pub. Date: Mar. 2, 2017

(65) Prior Publication Data
US 2018/0185938 A1 Jul. 5, 2018

(30) Foreign Application Priority Data

Aug. 24, 2015 (JP) .................................. 2015-165103

(51) Int. Cl.
*B23D 61/04* (2006.01)
*B23D 61/02* (2006.01)

(52) U.S. Cl.
CPC ........... *B23D 61/04* (2013.01); *B23D 61/028* (2013.01)

(58) Field of Classification Search
CPC ........ B23D 61/04; B23D 61/06; B23D 61/02; B23D 61/14; Y10T 83/9319; Y10T 83/9326; Y10T 83/9329
See application file for complete search history.

(56) References Cited

U.S. PATENT DOCUMENTS

| 4,604,933 A | 8/1986 | Lesher et al. |
| 2011/0318119 A1 | 12/2011 | Ejderklint |
| 2016/0082534 A1* | 3/2016 | Fujiwara .............. B23D 61/028 |

FOREIGN PATENT DOCUMENTS

| DE | 2931965 A | * | 2/1981 |
| DE | 202004005773 U1 | | 7/2004 |

(Continued)

OTHER PUBLICATIONS

English Translation of JP59007518 (Year: 1984).*

(Continued)

*Primary Examiner* — Jennifer B Swinney
(74) *Attorney, Agent, or Firm* — Norton Rose Fulbright US LLP

(57) ABSTRACT

A circular saw blade to cut electric resistance welded pipes in the electric resistance welded pipe production line experiences an excessive load on hard tips thereof because of the limited cutting time, which results in reduced durability and chipping.

[Solution] A flank 18 is provided with a first flank 20 located at the center thereof, and second and third flanks 22, 24 located inclined toward the respective sides of the first flank 20. Therefore, the lateral sides of the flank 18 have a constant clearance angle rearward from a cutting edge 34, which provides advantages of increased strength and resistance to chipping. Furthermore, a fourth flank 26 having a larger clearance angle is separately provided at the rear of the first flank 20 located at the center. Even if the first flank 20 wears, it is possible to reduce the wear on the fourth flank 26 and improve the durability.

8 Claims, 5 Drawing Sheets

(56) References Cited

FOREIGN PATENT DOCUMENTS

| DE | 102013008014 A1 | * | 11/2014 | ............. B23D 61/04 |
| --- | --- | --- | --- | --- |
| DE | 102013008014 A1 |   | 11/2014 |   |
| JP | 59007518 A | * | 1/1984 | ............. B23D 61/04 |
| JP | 4-9220 A |   | 1/1992 |   |
| JP | 5-8115 A |   | 1/1993 |   |
| JP | 2000-52140 A |   | 2/2000 |   |
| JP | 2008-6530 A |   | 1/2008 |   |
| JP | 4164708 B |   | 8/2008 |   |
| JP | 2012-56067 A |   | 3/2012 |   |
| WO | WO-2013098963 A1 | * | 7/2013 | ............ B23D 61/021 |
| WO | WO-2015098360 A1 | * | 7/2015 | ............. B23D 61/04 |

OTHER PUBLICATIONS

Office Action dated Jun. 4, 2019 to corresponding Japanese Patent Application No. 2015-165103.
Office Action dated May 14, 2019 to corresponding Chinese Patent Application No. 201680049006.5.

* cited by examiner

F I G. 6
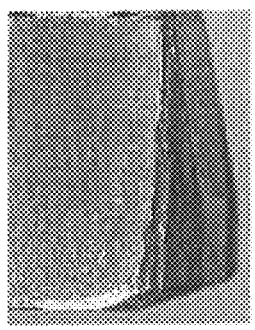 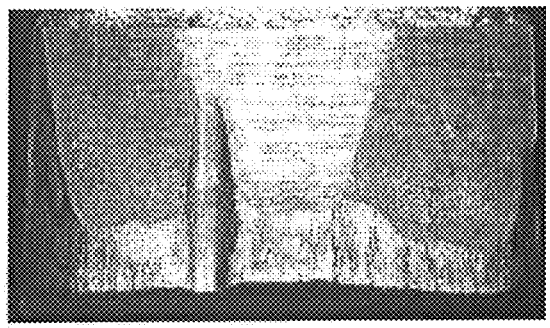 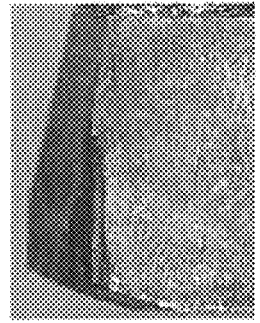
LEFT SIDE FACE         PERIPHERAL SURFACE         RIGHT SIDE FACE
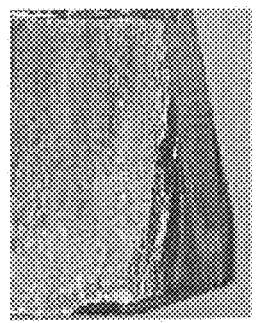 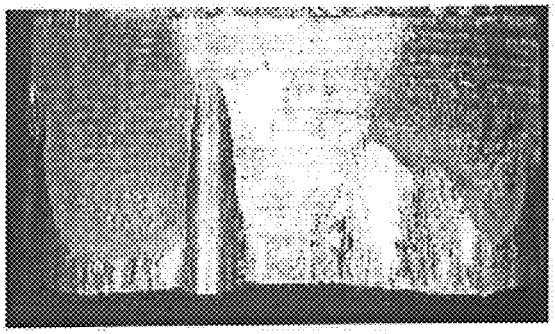 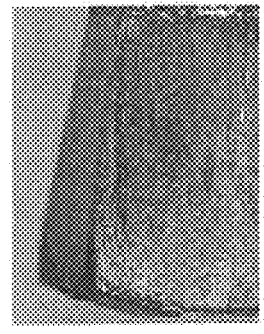
LEFT SIDE FACE         PERIPHERAL SURFACE         RIGHT SIDE FACE

LEFT SIDE FACE     PERIPHERAL SURFACE     RIGHT SIDE FACE

LEFT SIDE FACE     PERIPHERAL SURFACE     RIGHT SIDE FACE

CIRCULAR SAW BLADE WITH TIPS

CROSS REFERENCES TO RELATED APPLICATIONS

This application is a national stage application pursuant to 35 U.S.C. § 371 of International Application No. PCT/JP2016/72177, filed on Jul. 28, 2016, which claims priority under 35 U.S.C. § 119 to Japanese Patent Application No. 2015-165103, filed on Aug. 24, 2015, the disclosures of which are hereby incorporated by reference in their entireties.

TECHNICAL FIELD

The present invention relates to a circular saw blade provided with tips having hard tips fixed for cutting works of various metals at high speed, and, in particular, to a circular saw blade with tips (hereinafter referred to as "circular saw blade") whose hard tips have remarkably improved wear resistance and fracture resistance.

BACKGROUND ART

As shown in FIG. 8, a circular saw blade (what is called a tipped saw blade) 10 having gullets 13 formed at predetermined intervals on the outer periphery of a circular base metal 12, and hard tips 14 fixed to the individual gullets 13 is widely used. This hard tip is made of, for example, a cemented carbide obtained by sintering tungsten carbide and cobalt, or a cermet such as TiN, TiC or TiCN, so that the hard tip is extremely excellent in abrasion resistance. Therefore, the circular saw blade using the hard tips as saw blades is suitably adopted for cutting or cutting in work pieces (works) made of steel, nonferrous metal, synthetic resins, and other composite materials.

RELATED ART

Patent Documents

Patent Document 1: Japanese Patent No. 4164708

SUMMARY OF THE INVENTION

Problem to be Solved by the Invention

As an applicable use of the circular saw blade having saw blades of the hard tips, for example, the flying cutting of electric resistance welded pipes is practically used. This flying cutting cuts a so-called electric resistance welded pipe at specified lengths, which is an elongated hollow pipe obtained by rolling a rolled steel plate having a constant thickness in a tubular form after that carried out electric resistance welding or high-frequency welding at longitudinal seams. This cutting is carried out during running of the electric resistance welded pipe produced in the pipe making process, and the circular saw blade is used in a cutting machine that runs abreast in synchronism with the running speed of the electric resistance welded pipe.

The flying cutting machine runs in the same direction as the electric resistance welded pipe at a speed synchronous with the running speed of the electric resistance welded pipe while rotating the entire circular saw blade around the electric resistance welded pipe which is a work piece. Since the circular saw blade used for a flying cutting machine cuts an electric resistance welded pipe in synchronism with the pipe forming speed of the electric resistance welded pipe in this way, the time required for cutting is limited. Further, since it is necessary to move the circular saw blade itself around the electric resistance welded pipe at a high speed, an excessive load is applied to the hard tips of the circular saw blade as compared with a case of normally cutting a work of the same material. Therefore, the durability of ordinary hard tips is not sufficient for the hard tips of a circular saw blade used for a flying cutting machine or the like, with an additional drawback such that a part of the hard tip may be chipped off due to the excessive load.

Various proposals have been made on the forms of, and the materials of, hard tips as the specification for cutting metal works at high speed or heavy cutting. For example, Japanese Patent No. 4164708 discloses a tip which has an edge line formed along the outer edge of a first rake face of a hard tip and lead faces on both sides thereof, has a second rake face formed below the first rake face and the lead faces, and further has chamfered portions having an inclination angle of 25° to 35° provided at a corner portion of the outer edge of the lead faces on both sides. This proposal, which is to divide the rake face of the hard tip into three parts, has a drawback such that the hard tips, when used for a circular saw blade of a machine for flying cutting of the electric resistance welded pipe or the like, severely wear at the flanks, and thus have poor durability and chipping resistance.

As described above, the present invention has been proposed for a circular saw blade that is used for a flying cutting machine which runs together with an electric resistance welded pipe placed and produced in a pipe forming line, and cuts the pipe while rotating around the pipe, and it is an objective of the invention to improve the durability and chipping resistance of hard tips fixed to the circular saw blade.

Means for Solving the Problem

To solve the above problem and achieve the expected purpose, the subject matter as set forth in claim 1 is a circular saw blade with tips having hard tips fixed at predetermined intervals on an outer periphery of a base metal, wherein a rake angle of a rake face of the hard tip has a negative angle, a flank of the hard tip includes a first flank located at a center, and second and third flanks located inclined to both sides from the first flank, and a fourth flank having a clearance angle larger than a clearance angle of the first flank is formed rearward the first flank.

According to the subject matter as set forth in claim 1, since the flank includes the first flank located at the center, and the second and third flanks located inclined to both sides from the first flank, a clearance angle rearward from a cutting edge (ridge) is constant in the vicinity of the sides of the flank, the tip advantageously has a high strength and thus may not be chipped easily. Further, the fourth flank having a larger clearance angle is provided in a divided manner behind the first flank at the center, so that even if the first flank wears earlier, the wear of the next fourth flank may be reduced, thereby improving the durability and chipping resistance.

Effects of the Invention

The well-improved durability and chipping resistance of the hard tips which are fixed to the outer periphery of the circular saw blade bring about an effect of considerably lengthening the service life of the circular saw blade even under a heavy load in a short time or heavy cutting, such as in the case of cutting an electric resistance welded pipe during running, as compared with the conventional circular saw blades.

BRIEF DESCRIPTION OF DRAWINGS

FIG. 6 A photograph showing the state of wear after hard tips of the embodiment were tested.

MODE FOR CARRYING OUT THE INVENTION

Figure 1:
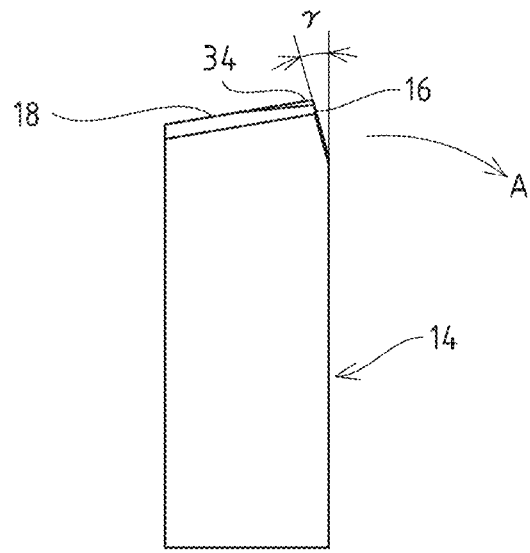
FIG. 1 A side view of a hard tip according to an embodiment of the invention.

Next, a circular saw blade according to the present invention will be described with reference to the drawings by way of a preferred embodiment. FIGS. 1 to 4 are views of a hard tip 14 of a circular saw blade made of, for example, cemented carbide, observed from various directions. In particular, FIG. 1 is a side view of the hard tip 14, with a circular saw blade 10 rotating in a direction indicated by an arrow A. A rake face 16 of the hard tip 14 is inclined upward at the front side of the tip body (the face directed in the rotational direction of the circular saw blade), with a rake angle γ of the rake face 16 being a negative angle.

Figure 2:
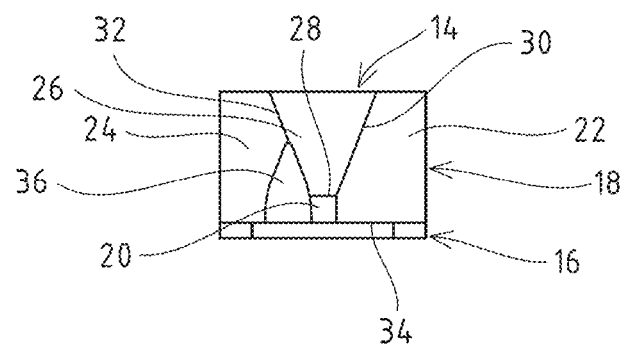
FIG. 2 A plan view of the hard tip shown in FIG. 1.

As may be seen from FIG. 2, in particular, the flank of the hard tip 14 is divided into four flanks. The "flank" refers to a surface that does not contact a work when cutting the work with a blade (hard tip), and, in the case of the hard tip of a circular saw blade, refers to a surface in a direction to retreat in the rotational direction of the circular saw blade.

Figure 5:
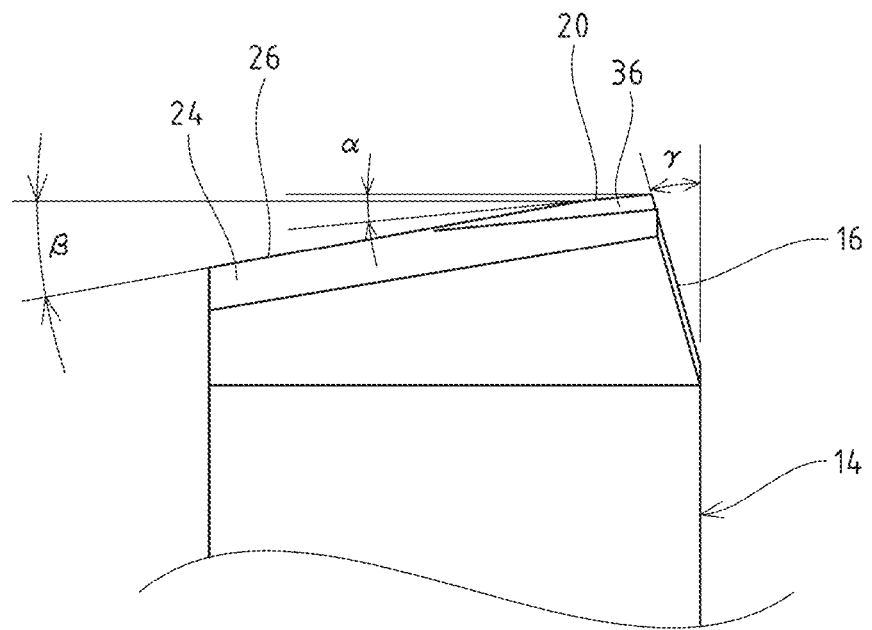
FIG. 5 An enlarged view of an upper side surface of the hard tip shown in FIG. 1.

As may be seen from FIG. 2, a flank 18 of the hard tip 14 has a first flank 20 located at the center thereof and contacting the rake face 16 via a cutting edge (ridge) 34, and a second flank 22 and a third flank 24 which are inclined to the respective sides of the first flank 20 (left and right in FIG. 2). A fourth flank 26 being adjacent to the first flank 20 via the ridge 28 and having a clearance angle β larger than a clearance angle α of the first flank 20 is formed rearward of the first flank 20. The relation (α<β) of the clearance angle β being larger than the clearance angle α is shown in an enlarged view in FIG. 5. If the clearance angle β of the fourth flank 26 is set too large (for example, 20° or greater), the trapezoid (to be described later) becomes a hexagon, so that at the time of polishing the fourth flank 26, the base metal rearward of the rotating hard tip 14 may be scraped, or polishing may take extra time.

As shown in FIG. 2, the fourth flank 26 has a trapezoidal shape with the first flank 20 serving as the top side and the ridge on the back side of the hard tip 14 serving as the base. That is, the fourth flank 26 has, as a top portion, a ridge 28 which is a boundary intersecting with the first flank 20, intersects with the second flank 22 via a right ridge 30 in FIG. 2, and intersects with the third flank 24 via a left ridge 32, so that the fourth flank 26 has a trapezoidal shape or a shape like that of Mt. Fuji as a whole. In other words, the area of the fourth flank 26 is set to be sufficiently larger than the area of the first flank 20.

Figure 3:
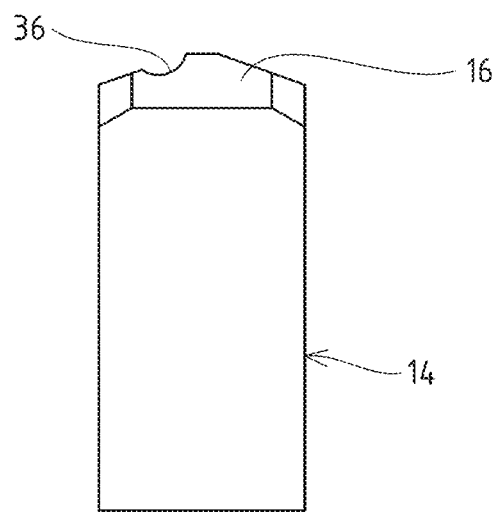
FIG. 3 A front view of the hard tip shown in FIG. 1.
Figure 4:
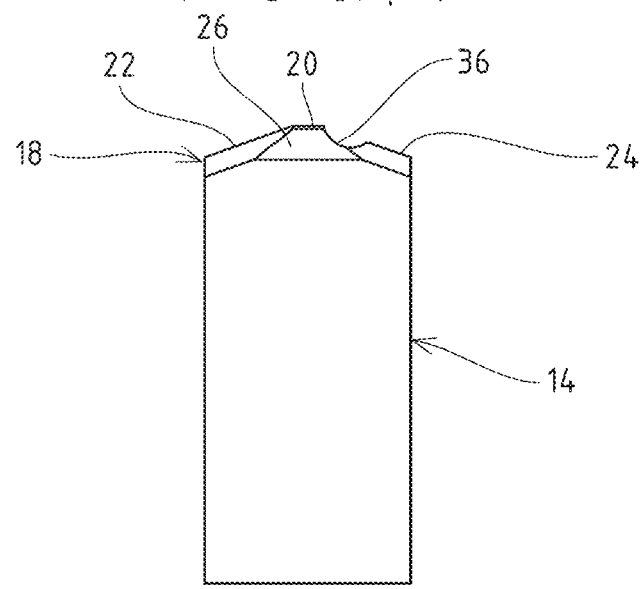
FIG. 4 A rear view of the hard tip shown in FIG. 1.

Further, as shown in FIGS. 2 to 4, the hard tip 14 is provided with a dividing groove 36 extending from the cutting edge (ridge) 34 where the rake face 16 and the flank 18 intersect with each other to the flank 18. According to the circular saw blade of the embodiment of the invention, the clearance angle is constant from the cutting edge of the flank to the rear side at a portion close to the side face of the flank, so that the hard tip 14 is strong so as not to be easily chipped. Also, only the central portion of the cutting edge on the flank has two flank stages, so that even if the first stage wears early, the large clearance angle of the second stage may decrease the abrasion width, thus improving the durability.

TEST EXAMPLE

Cutting was carried out under the same conditions using a circular saw blade using hard tips according to the embodiment and a circular saw blade using the conventional hard tips to compare the wearing states of the tips.

[Cutting Conditions]
A hollow pipe made of X60 (for oil well pipe) was used as a work piece. The pipe was 52 mm in diameter, and 6.0 mm in thickness.
The circular saw blade in use had an outer diameter of 430 mm, a tooth width of 6.0 mm, and 54 teeth.
Conditions: the peripheral velocity V=300 m/min, Sz1=0.1 mm/z, and Sz2=0.18 mm/z
The following are the wearing states of the hard tips of the tested circular saw blades.

TABLE 1

| Specification | Achieved cutting area ($m^2$) of work piece | Wearing width (mm) |
| --- | --- | --- |
| Tips of embodiment | 4.7 | 0.8 |
|  |  | 0.4 |
| Conventional tips | 4.0 | 0.7 |
|  |  | 1.3 |

[Wearing States]
Significant differences in wearing state between the hard tips of the example and the conventional hard tips were observed. Despite the achievement of 4.7 $m^2$, the circular saw blade of the example had a smaller wearing width than the conventional circular saw blade with the achievement of 4.0 $m^2$. The peripheral wear was suppressed at the boundary line of the outer diameters of the two stages as intended.

Figure 7:
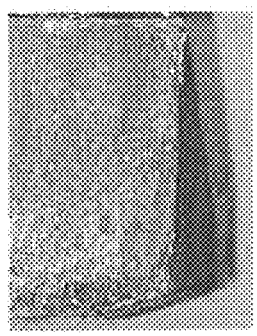
FIG. 7 A photograph showing the state of wear after conventional hard tips were tested.
Figure 7:
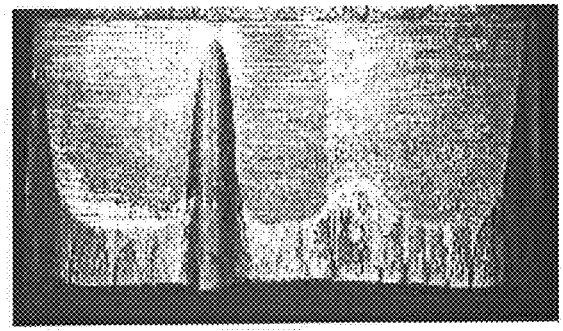
Figure 7:
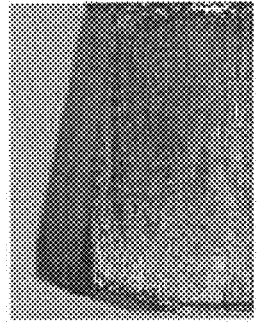
Figure 7:
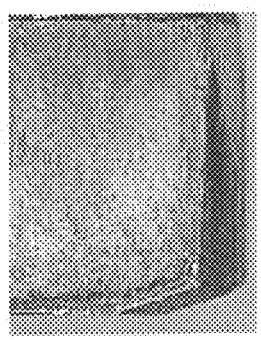
Figure 7:
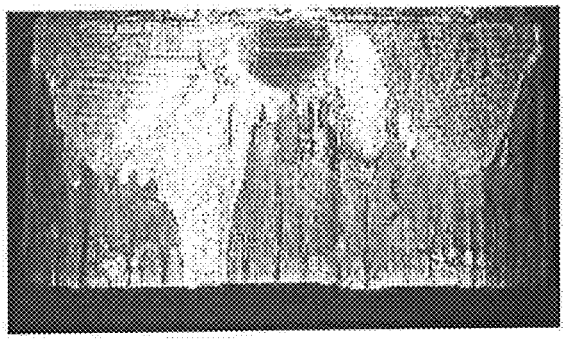
Figure 7:
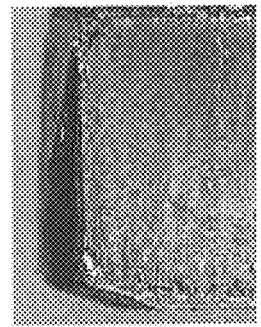
Figure 8:
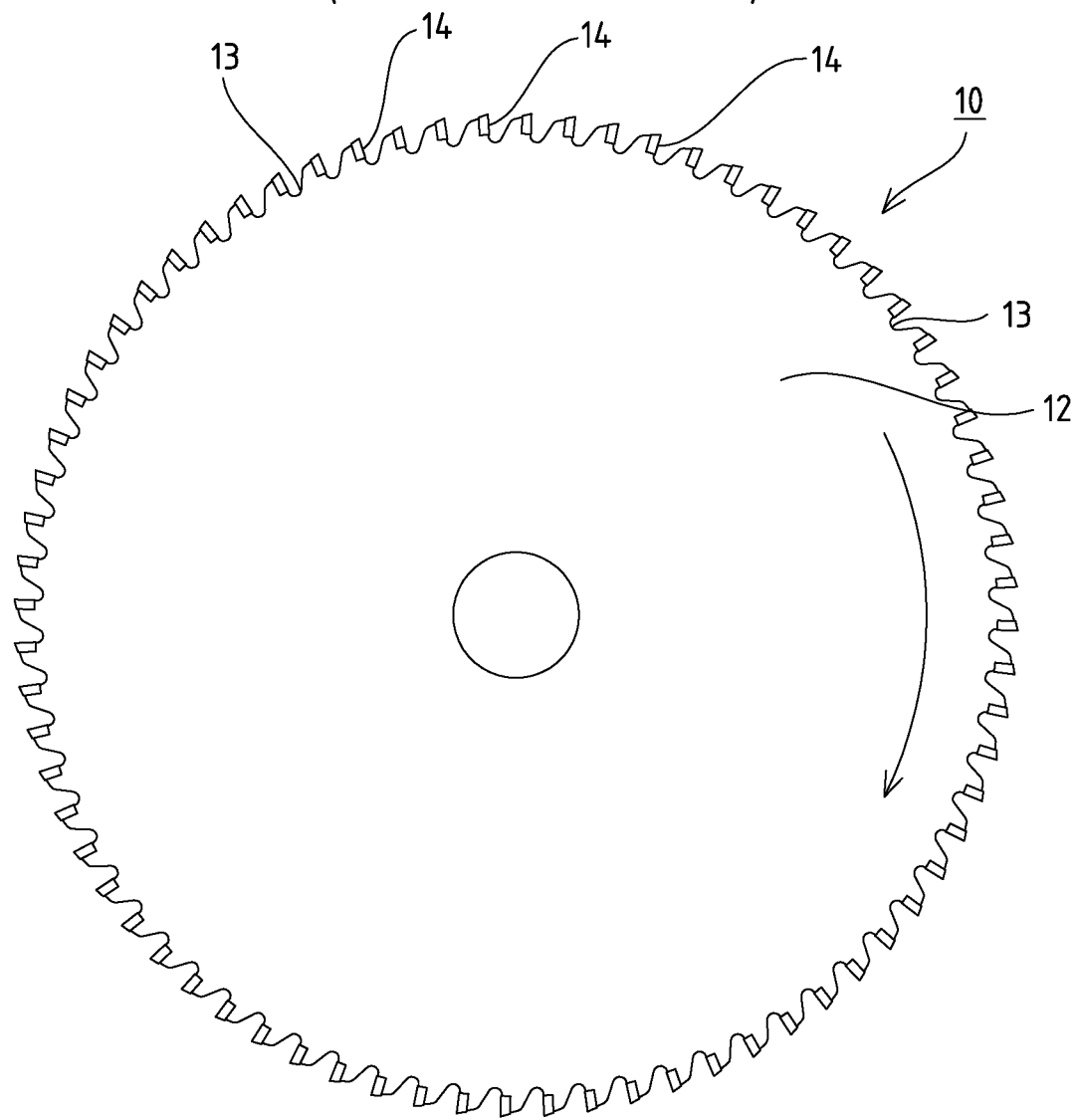
FIG. 8 A side view of a circular saw blade with tips having hard tips fixed to the outer periphery of a base metal.

FIGS. 6 and 7 show the wearing states of the hard tips. The hard tips according to the example shown in FIG. 6 well show less wearing.

DESCRIPTION OF REFERENCE NUMERALS

10 Circular saw blade with tips
12 Base metal
14 Hard tip
16 Rake face
18 Flank
20 First flank
22 Second flank
24 Third flank
26 Fourth flank
28 Ridge
30 Right ridge
32 Left ridge
34 Cutting edge (ridge)
36 Dividing groove α Clearance angle
β Clearance angle (α<β)
γ Rake angle

The invention claimed is:

1. A circular saw blade having hard tips fixed at predetermined intervals on an outer periphery of a base metal, wherein:
a rake angle of a rake face of a hard tip of the hard tips has a negative angle;
a flank of the hard tip comprises a first flank located at a center of the flank, and second and third flanks positioned on opposite sides of the first flank and angled relative to the first flank;
a fourth flank having a clearance angle larger than a clearance angle of the first flank is positioned rearward of the first flank and facing a direction opposite a rotational direction of the circular saw blade; and
wherein the fourth flank has a trapezoidal shape intersecting the first flank via a ridge forming a top portion of the fourth flank, and intersecting with the second and third flanks via left and right ridges.

2. The circular saw blade according to claim 1, wherein the rake face comprises a cutting face of the hard tip.

3. The circular saw blade according to claim 1, wherein the rake face comprises a front face of the hard tip.

4. The circular saw blade according to claim 1, wherein the flank comprises a back side of the hard tip.

5. A circular saw blade comprising:
a base; and
a plurality of tips fixed at intervals on an outer periphery of the base;
wherein:
a rake angle of a rake face of a tip of the plurality of tips has a negative angle;
the tip comprises a first flank, second and third flanks extending toward the base of the circular saw blade from opposite sides of the first flank, and a fourth flank having a clearance angle larger than a clearance angle of the first flank; and
the fourth flank comprises a trapezoidal shape having a first and second base and a first and second leg, the first base being a common edge of the first and fourth flanks, the first leg being a common edge of the second and fourth flanks, and the second leg being a common edge of the third and fourth flanks.

6. The circular saw blade according to claim 5, wherein the rake face comprises a cutting face of the tip.

7. The circular saw blade according to claim 5, wherein the rake face comprises a front face of the tip.

8. The circular saw blade according to claim 5, wherein the first flank, the second flank, the third flank, and the fourth flank comprise a flank of the tip, and wherein the flank of the tip comprises a back side of the tip.

* * * * *